United States Patent [19]

Schneider

[11] 3,971,844
[45] July 27, 1976

[54] METHOD FOR REMOVING SODIUM SULFATE FROM AQUEOUS SOLUTIONS

[75] Inventor: Raymond T. Schneider, Lakeland, Fla.

[73] Assignee: Davy Powergas Inc., Lakeland, Fla.

[22] Filed: Feb. 19, 1974

[21] Appl. No.: 443,326

[52] U.S. Cl. .............................. 423/182; 423/199; 423/242; 423/551
[51] Int. Cl.² .................................... C01B 17/00
[58] Field of Search ........... 423/242, 519, 540–543, 423/551, 193, 184, 539, 182; 23/302 R

[56] References Cited
UNITED STATES PATENTS

| | | | |
|---|---|---|---|
| 3,607,033 | 9/1971 | Shah | 423/540 |
| 3,607,037 | 9/1971 | Terrana et al. | 423/540 |
| 3,650,692 | 3/1972 | Villiers et al. | 423/540 |
| 3,653,812 | 4/1972 | Schneider et al. | 423/242 |
| 3,758,668 | 9/1973 | Lapple et al. | 423/541 |
| 3,775,532 | 11/1973 | Shah | 423/541 |
| 3,826,812 | 7/1974 | Cook et al. | 425/542 |

FOREIGN PATENTS OR APPLICATIONS

| | | | |
|---|---|---|---|
| 394,646 | 9/1931 | United Kingdom | 423/551 |

Primary Examiner—Oscar R. Vertiz
Assistant Examiner—Wayne A. Langel
Attorney, Agent, or Firm—Morton, Bernard, Brown, Roberts & Sutherland

[57] ABSTRACT

Metal, e.g. sodium sulfate, is separated from metal, e.g. sodium sulfite, in a solution, for instance a solution used in a system involving contact of sulfur dioxide-containing gases with the sodium sulfite solution as an absorbing solution to recover sulfur dioxide wherein the absorbing solution is regenerated after contact with the gas and recycled for further use. A portion of the absorbing solution is purged to avoid the unduly large build-up of sodium sulfate in it. The purge stream is contacted with sulfur dioxide to reduce the amount of sodium sulfite therein to relatively soluble sodium bisulfite, and the relatively insoluble sodium sulfate is recovered therefrom as undissolved solids. The liquid separated from the sodium sulfate, which is rich in sodium bisulfite, is returned to the absorbing solution. In a preferred aspect, the purge stream is withdrawn from the absorbing solution subsequent to contact with the sulfur dioxide-containing gases and before regeneration.

9 Claims, 1 Drawing Figure

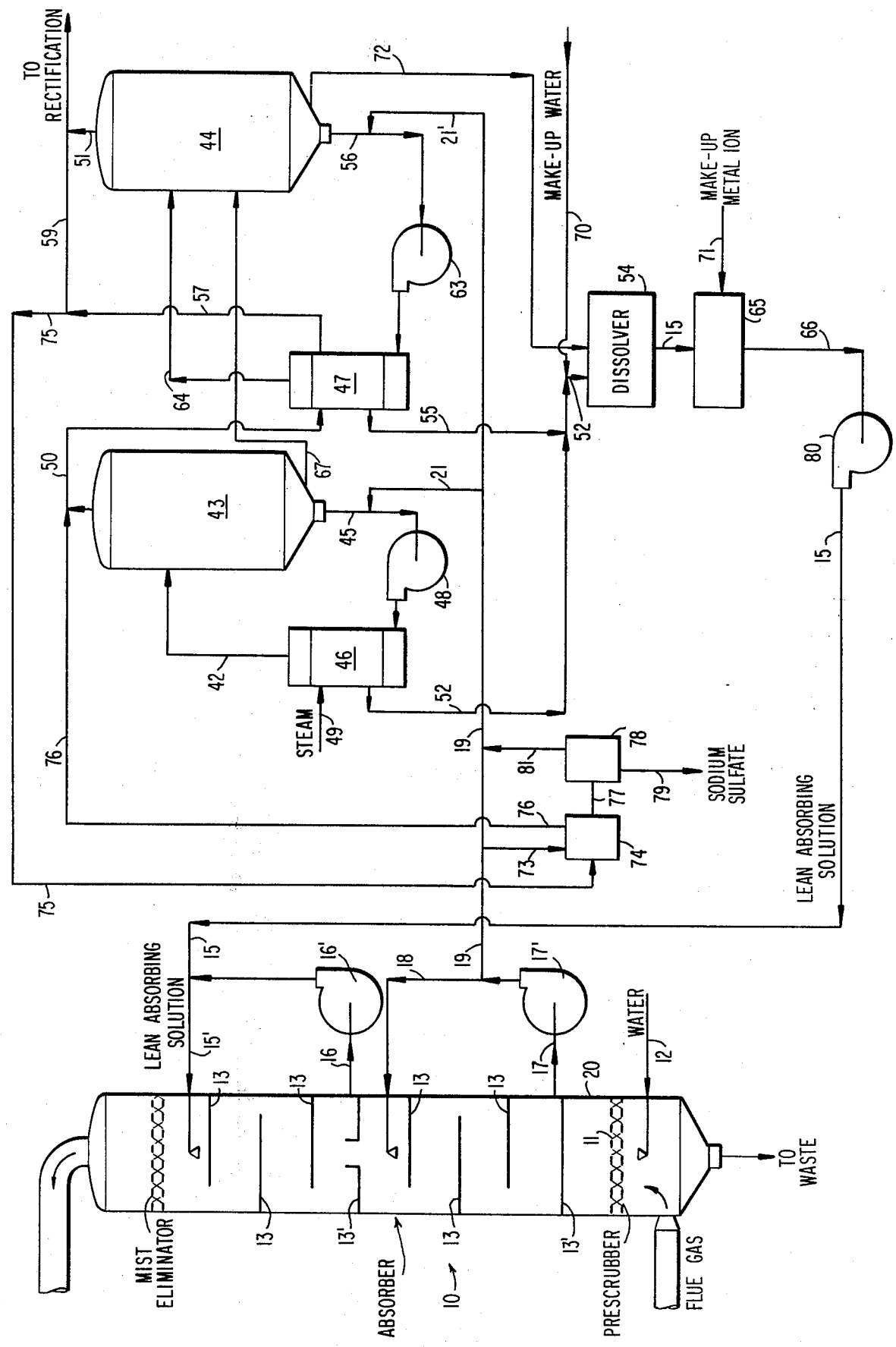

METHOD FOR REMOVING SODIUM SULFATE FROM AQUEOUS SOLUTIONS

This invention relates to a process for separating metal sulfate from a solution containing it, and metal sulfite which involves contacting the solution with sulfur dioxide, and is particularly concerned with a process for treating such a solution which is used to recover sulfur dioxide from a gas containing the same. It is advantageously employed in such a sulfur dioxide recovery process to reduce metal loss in a system wherein sulfur dioxide is desorbed from a spent absorbing solution to regenerate lean absorbing solution for further use in the recovery of sulfur dioxide.

The sulfur dioxide-containing gas treated in a sulfur dioxide recovery system often contains sulfur trioxide, oxygen or other oxidizing material. Such oxidizing components tend to convert sodium sulfite to sulfate, an inert material for purposes of the sulfur dioxide absorption process. Since the sulfate is not regenerated to sulfite during the desorbing operation, it will remain as an inert material in the sulfur dioxide absorption-desorption system. Conveniently, a portion of the sodium sulfite-containing solution is purged from the system to prevent unduly large amounts of inert sulfate from accumulating in the absorbing solution. This purge has generally been conducted subsequent to the desorption of the sulfur dioxide from the absorbing solution and prior to the addition of sodium ion to replace the metal values which are lost through the purge. The purge material, containing sodium sulfite, sodium bisulfite, and sodium sulfate, has often been discarded as an unwanted by-product of the reaction.

It has been proposed to separate the sodium sulfate in the purge from any sulfite or bisulfite values therein and return the sulfite or bisulfite to the absorbing system. Generally, separation of sodium sulfate from sulfite and bisulfite is by crystallization; however, the sulfate-crystallization product normally contains significant amounts of sodium sulfite. Thus, not only is the sodium sulfate product impure, but also, the metal values associated with the sodium sulfite in the sodium sulfate product disadvantageously adds to the metal value loss from the system.

Sulfur dioxide is a recognized pollutant of the atmosphere and is produced by oxidation of sulfur or sulfur-bearing materials. Sulfur dioxide is found in significant amounts as a constitutent of various waste gases such as smelter, off-gases from various chemical plants, and stack or furnace gases from coal-or oil-burning furnaces such as are used in electric power plants. Although the concentration of sulfur dioxide in such gases is generally from about 0.001 to less than about 5 mole percent and is frequently less than 0.5 mole percent (about 1 percent by weight), the emission of sulfur-dioxide may be substantial, particularly in industrial applications due to the amount of sulfur-bearing material being processed. For instance, a modern electric plant having a 1,350,000 kw. capacity will burn up to about 15,000 tons of coal per day. Despite the fact that the concentration of stack gases from the electric plant can be low, e.g., on the order of 0.2 to 0.3 mole percent, the sulfur dioxide produced may be in the neighborhood of 1,000 tons per day. Similarly, significant amounts of sulfur dioxide are produced in utilization of other fuels which may bear sulfur.

The removal of sulfur dioxide from sulfur dioxide-containing gases may be effected by treatment with an aqueous sodium sulfite solution. For instance, sulfur dioxide-containing gas, obtained by burning sulfur-containing mineral products for fuels and the like, can be contacted with sodium sulfite in an aqueous solution to form an aqueous solution of sodium sulfite and sodium bisulfite, and thereby substantially reduce the sulfur dioxide content of the gas to, for instance, less than about 0.02 mole percent when the sulfur dioxide-containing gas comprises more than about 0.2 mole percent sulfur dioxide. The recovery of sulfur dioxide from the gases is often up to about 95 percent or more. The spent absorbing solution can be heated at a temperature in the range of about below 300°F., preferably about 170° to about 200°F., to convert the sodium bisulfite to sodium sulfite and sulfur dioxide, and thus regenerate the absorbing solution. The sulfur dioxide can be drawn off and be either cooled or compressed to provide a liquid product or sent, as a gas, to a sulfuric acid plant or sulfur plant. The regenerated absorbing solution can be recycled to the absorption zone. For additional information and further exemplification regarding sulfur dioxide recovery systems which can advantageously incorporate the technology disclosed herein, see U.S. Pat. Nos. 3,607,037 and 3,653,812, and U.S. Pat. Application Ser. No. 117,383, filed Feb. 22, 1971, now U.S. Pat. No. 3,790,660 all of which are incorporated herein by reference.

The sulfur dioxide-containing gases usually contain oxidizing materials such as oxygen, elemental iron, and the like, and, particularly when the gases containing sulfur dioxide result from the combustion of fuel, other oxidizing agents present are the nitrogen oxides. These oxidizing materials promote the oxidation of the sodium sulfite or bisulfite to sodium sulfate. The sodium sulfate is regarded as a troublesome contaminant of the sodium sulfite-containing absorbing solution since even the generation of minor amounts of sodium sulfate can lead to the buildup of high solids content in the absorbing solution. As stated, above, a purge stream has been used to draw off excessive sodium sulfate. Regeneration of sodium sulfite from sodium sulfate, however, is often uneconomical on a commercial scale due to the volume of sulfur dioxide-containing gases treated and the amount of sulfur dioxide being absorbed into the aqueous sodium sulfite, and due to the cost in energy required to effect such regeneration.

The operation of an efficient and economical system for removal of sulfur dioxide will be characterized not only in the efficiency of absorption of sulfur dioxide from the sulfur dioxide-containing gases, the efficiency of desorption of sulfur dioxide from the spent absorbing solution, and the purity of the sulfur dioxide product, but also by the minimization of loss of metal values and the ability to obtain by-products from the absorbing system in a commercially-acceptable form. One by-product of the absorption system which may have commercial use is sodium sulfate. Sodium sulfate may be employed in the manufacture of kraft paper, paper board, and glass; used as a filler in synthetic detergents; or used in processing textile fibers and the like. Since sodium sulfate is generally available in a purity of 99.5 percent, it is desirable to recover the sodium sulfate from the sulfur dioxide absorption system in a purity which is commercially-acceptable or can be readily and inexpensively purified to a commercially-attractive product.

In accordance with an object of this invention, the sulfate-containing purge stream from a sulfur-dioxide recovery system is treated with sulfur dioxide to enable the recovery of a sodium sulfate by-product which is relatively free from sodium sulfite, while at the same time providing sodium bisulfite which can be advantageously reused in sulfur dioxide recovery systems.

In accordance with the present invention, the sulfate-containing purge stream, which contains sodium sulfite, sodium bisulfite, and sodium sulfate, and generally amounts from about 0.1 to 30 and preferably about 0.5 to 20 volume percent of the absorbing solution, is contacted with sulfur dioxide to convert sodium sulfite therein to sodium bisulfite. The sulfur dioxide, advantageously in gaseous form, preferably has a greater concentration of sulfur dioxide than the sulfur dioxide-containing gas treated by the absorption system, and generally, the gas for treatment of the purge stream comprises at least about 3, preferably at least about 5, and conveniently at least about 35, weight percent sulfur dioxide. A particularly advantageous source of sulfur dioxide for treating the sulfate purge stream is the product gas from the desorption operation of a sulfur dioxide recovery system mentioned above. Such a product gas, for instance, may comprise about 40 to 90 volume percent sulfur dioxide.

The amount of sulfur dioxide provided for reaction with the sulfate purge stream should advantageously be at least sufficient for stoichiometric combination with 50 percent of the sulfite in the purge stream to provide bisulfite, i.e., at least one-half mole of sulfur dioxide is provided per mole of sodium sulfite in the purge stream. Preferably, the mole ratio of sulfur dioxide to sulfite in the purge stream is at least about 0.5 to 15:1, more preferably about 1 to 10:1.

The contact of the sulfur dioxide gas with the purge is generally, for a time, sufficient to provide a ratio of moles of active sulfur per 100 moles of water, to moles of active base per 100 moles of water, hereinafter referred to as "$s/c$," of about 0.85 to 1:1, preferably about 0.9 or 0.95 to 1:1. The contact of the sulfur dioxide-containing gas should provide an increase in $s/c$, for instance, at least about a 0.02:1, preferably at least about a 0.05:1 increase. Generally, the amount of sulfur dioxide-containing gas, and the time of its contact with the purge, should not be excessive such that the solution becomes saturated with sulfur dioxide, which may result in the formation of unduly excessive amounts of sodium pyrosulfite, which, under the conditions of separation, may be separated from the solution with the sulfate. The presence of trace metals may effect the amount of sodium pyrosulfite, which can be formed without undue loss, with the sodium sulfate during separation.

Subsequent to contact of the purge stream with sulfur dioxide, sodium sulfate may be separated, for instance, crystallized from the solution as relatively pure sodium sulfate, and the remaining liquor, which is rich in sodium bisulfite, is returned to the sulfur dioxide recovery system, for instance it can be admixed with the absorbing solution.

When a sulfur dioxide recovery system is involved, the volume of sulfate purge is generally an amount sufficient to maintain the sulfate contents of the lean absorbing solution at a predetermined level, for instance, in the range of not more than about 40, preferably less than about 25, weight percent, based on total sodium salts (anhydrous basis). The particular concentration of sulfate in the lean absorbing solution will depend upon the particular absorption process employed for removing sulfur dioxide from sulfur dioxide-containing gas, the efficiency of the absorption system, the efficiency of the desorption operation, the amount of oxidants in the sulfur dioxide-containing gas, and the like. The amount of sulfate in the absorbing is generally at least about 1 and up to 25, often from about 10 to 22, weight percent (anhydrous basis), of the total weight of the sodium salts.

The purge to remove sulfate may be accomplished at any convenient point in the sulfur dioxide absorption system. For instance, the purge may be taken from the lean absorbing solution or from about the spent absorbing solution. Preferably, the purge is of the spent absorbing solution since the sulfite concentration is lower in the spent absorbing solution than the lean absorbing solution. For instance, the $s/c$ in the lean absorbing solution, in the system described in the patents and patent applications mentioned above, is frequently from about 0.5 to 0.85:1, often from about 0.55 to 0.8:1, and the $s/c$ in the spent absorbing solution is frequently from about 0.7 to 0.95:1, often from about 0.8 to 0.85:1.

Sufficient water can advantageously be provided in the lean absorbing solution which is conducted to the absorption tower to provide about 15 to 50 weight percent total sodium salt values (anhydrous basis) in the solution. The solution conducted from the desorbing operation may contain less than about 10 percent water.

The present invention will be further described by using the drawing which is a schematic flow sheet of a process employing the present invention in an absorbing system for removal and recovery of sulfur dioxide from a flue gas. Equipment such as valves, pumps, heat exchangers, surge tanks, and the like, which would be used in a commercial embodiment of the invention and in the operation of an absorption system, is not shown since it can be of conventional design and employed in accordance with practices well known in the art.

Referring to the drawing, sulfur dioxide containing flue gas, which may contain from about 0.05 to about 5 mole percent sulfur dioxide, enters absorber vessel 10 near the bottom thereof. The flue gas passes upwardly through pre-scrubber zone 20 in vessel 10. Water or other aqueous liquid is passed concurrently with the flue gas to a bed of column packing 11, the water or other liquid means being supplied through line 12. This prescrubbing with an aqueous liquid serves to remove suspended solids such as fly-ash and the relatively high water-soluble components, for instance, sulfur trioxide, from the flue gases.

The prescrubbed gas next enters a main absorption zone in absorber 10 wherein it passes upwardly, through sieve trays 13, and through a descending flow of lean absorbing solution which is supplied to vessel 10 through lines 15 and 15'. Absorber 10 may employ other types of liquid gas contacting structures, such as a packed tower, bubble cap column, alternate ring and discs or the like. The lean absorbing solution in line 15 is often at a temperature of at least about 90°F., preferably at least about 100°F., up to about 230°F., preferably up to about 190°F. Flow rates of the aqueous absorbing solutions through the absorption zone can be adjusted according to the sulfur dioxide concentration in the gas being treated, and the sulfite concentration in the solution so that a major amount, e.g., up to about 95 percent or more, of the sulfur dioxide may be removed from the gas by reaction with the lean absorbing solution.

To provide for a better absorption of the sulfur dioxide, the absorbing solution as collected on gas-passing trays 13' located in the middle and at the bottom of the absorbing section of absorber and a portion of the solution is recycled to the column. Thus, the liquid on upper tray 13' is recycled to the upper part of the absorber by way of line 16, pump 16' and line 15', while liquid from the lower tray 13' is recycled to the column at a point just below upper tray 13' via line 17, pump 17' and line 18. Spent absorbing solution is removed from line 18 through line 19. A purge stream containing sodium sulfate is drawn off from line 19 via line 73 to absorber 74 for treatment. A sulfur dioxide-rich stream from line 75 is contacted with the purge stream generally at a temperature in the range of about 90° to 200°, preferably 100° to 190°F., e.g., about 100°to 180°F to convert the sulfite in the absorbing solution to bisulfite. The temperature of the purge treatment may be related to where the purge stream is taken, for instance, purge stream of absorbing solution from the absorption tower would generally be different than a purge of the lean absorbing solution to the tower. Factors such as indirect heat exchange with the ambient atmosphere, and the like, may also affect the temperature of the purge. A further factor is the source of sulfur dioxide-containing gas for treating the purge. Often, using product gas as the source of sulfur dioxide and a purge from the spent absorbing solution, the temperature of contact of the sulfur dioxide and purge is about 130° to 180°F.

The purge-treatment absorber may be of a convenient design, and counter current contact between the sulfate-containing purge stream and sulfur dioxide-containing gas is preferred. The absorber may be a single stage or a multiple stage absorber and may be a packed tower or use sieve trays, bubble cap trays, altenative ring and discs, and the like. The off gases from absorber 74 exit via line 76 and can, for instance, be combined with the product gas.

The bottom from absorber 74 are passed via line 77 to crystallizer 78 for recovery of sodium sulfate in a convenient manner. Generally, sodium sulfate is crystallized using lower temperatures than those in absorber 74, for instances, temperatures in the range of about 20° or 25° to 60°F. are employed. The temperature should not be so low that the absorbing fluid freezes, and higher temperatures are often uneconomical in terms of low crystal yield. The crystallized sodium sulfate is removed by a screw conveyor through line 79. The liquid from the crystallizer is lean in sodium sulfate and may be returned via line 81 to line 19. The separation of the solid sodium sulfate and liquid may be facilitated by the use of, for instance, a centrifuge or the like. Commonly available crystallizers include vertical and horizontal scraped-tube crystallizers and drum flaker crystallizers.

The amount of sulfate removed by separation may vary, depending upon the operation of the absorption system, the efficiency of the separation, and the desired sulfate product purity. Generally, the lesser the portion of sulfate removed from the treated purge, a higher purity product can be obtained and the separation can be more easily effected. On the other hand, the greater the portion of sulfate removed, the greater the possiblility that significant amounts of sodium sulfite or sodium bisulfite are lost with the sulfate. Frequently, when separation is by crystallization, about 15 to 70, preferably 25 to 50, percent of the sodium sulfate in the purge stream is removed. The purity of the sulfate product may frequently be at least about 75 or 85 weight percent on an anhydrous basis, and crystallization may provide a sulfate product of at least about 95 or even 98 or 99, weight percent purity on an anhydrous basis.

The solution in line 19 is heated to a temperature in the range of about 150° to 350°F. or more, preferably at least about 200 or 215°F. to about 290° to 300°F. The heaters are not shown. The heated solution is introduced through lines 21 and 21' into the recycle circuits of the respective desorbers 43 and 44. The conditions of temperature, pressure, and residence time in desorbers 43 and 44 are so maintained as to effect the desired decomposition, evaporation, precipitation.

Desorbing vessels 43 and 44 are arranged in multiple-stage effect relationship. Desorbing vessel 43 is operated at the higher temperature and pressure, and vessel 44 at a lower temperature and pressure. A recycle stream is heated in connection with each of the vessels 43 and 44, the heating being done in calandrias 46 and 47, respectively. In order to effect heating in vessel 43, the slurry in the vessel is withdrawn by line 45, combined with feed from line 21, sent through pump 48, through metallic tubes of calandria 46 and back to vessel 43 by way of line 42. Similarly, the slurry in vessel 44 is withdrawn by line 56, and after being combined with spent absorbing solution from line 21', it is sent by pump 63 through metallic tubes of calandria 47 in line 64 back to desorbing vessel 44.

Steam is introduced to calandria 46 through line 49 as the prime energy source for the desorption zone. Calandria 47, meanwhile, is heated by the sulfur dioxide in water-containing overhead vapors in line 50 coming from desorbing vessel 43. The condensate (water) from calandria 46 is sent through lines 52 to dissolving tank 54. In calandria 47, the indirect heat exchange contacting effects condensation of a portion of the steam, but not the sulfur dioxide, in the overhead gases from desorbing vessel 43. The uncondensed vapors from calandria 47 are carried through line 57 to line 59. Line 57 typically carries vapor containing about 60 weight percent sulfur dioxide and the balance being essentially water vapor. A portion of the overhead passing through line 57 is withdrawn via line 75 for use in the sulfate purge absorber since the vapors have a high sulfur dioxide concentration.

The overhead vapors from desorbing vessel 44 are removed from the vessel via line 51 and are combined in line 59 with the vapors leaving calandria 47. The vapor in line 51 typically contains about 5 to 10 weight percent sulfur dioxide, the balance being essentially water vapor. The combined vapors in line 59 can be sent to a rectification system (not shown) for recovering sulfur dioxide.

A slurry is passed from desorber 43 to desorber 44 by way of line 67. The slurry is withdrawn from desorber 44 via line 72 which transports the slurry to dissolver 54. Since much of the water has been removed from the absorption solution during desorption, make up water, for example, from rectification (not shown), is supplied to tank 54 through line 70. A solution from dissolver tank 54 passes through line 15 to feed tank 65. Make-up sodium ion, which may be an aqueous sodium hydroxide solution, is added to feed tank 65 through line 71. The lean absorbing solution prepared in tank 65 is withdrawn through line 66 and is sent by pump 80 through line 15 to absorption zone 10 of the process.

The following example will further illustrate the present invention, but does not limit it.

EXAMPLE

A sulfur-dioxide absorption system which is essentially the same as in the drawing is employed to remove sulfur-dioxide from flue gas from a coal-burning furnace. The flue gas is at a temperature of about 340°F. and contains appproximately 0.25 mole percent sulfur dioxide, 0.005 mole percent sulfur trioxide, 11 mole percent carbon dioxide, 3.2 mole percent oxygen, 73.4 mole percent nitrogen and 11.7 mole percent water, 0.003 weight percent fly ash, and trace amounts of nitrogen oxides. The lean absorbing solution is at a temperature of about 140°F. and contains about 18.8 weight percent sodium sulfite, about 4.4 weight percent sodium bisulfite (calculated as the pyrosulfite, $Na_2S_2O_5$), about 4.8 weight percent sodium sulfate (17 weight percent on an anhydrous basis of the total weitht of the sodium salts), and the balance is essentially water.

The gas exiting the absorption tower contains less than 0.05 mole percent sulfur dioxide. The spent absorbing solution, having an $s/c$ of 0.85:1, contains approximately 5.8 weight percent sodium sulfite, 21.2 weight percent sodium bisulfite (calculated as the pyrosulfite), 5 weight percent sodium sulfate, and the balance is essentially water. Approximately 20 volume percent of the spent absorbing solution is purged to remove sufficient sulfate to avoid the build-up of undue amounts of sulfate in the absorbing solution.

The purge containing sodium sulfite, sodium bisulfite, and sodium sulfate, is contacted in a purge treatment absorber, countercurrent sieve plate absorber, with sulfur dioxide-containing gas at a temperature of about 140°F. The sulfur dioxide-containing gas contains about 60 weight percent sulfur dioxide with the balance being essentially water, and is provided in an amount of about 0.3 pounds of $SO_2$ per pound of sodium sulfite in the purge per unit time.

The overhead from the purge treatment absorber is essentially unreacted sulfur dioxide and water vapor, and is sent to rectification. The bottoms, having an $s/c$ of 0.9:1, contain about 6 pounds of sodium bisulfite (calculated as the pyrosulfite) per pound of sodium sulfite, less than about 1 pound of sodium sulfite per pound of sodium sulfate, and about 3 pounds of water per pound of the total amount of sodium salts. The bottoms are sent to a scraped tube crystallizer having its own refrigeration system, and are cooled to about 30° to 40°F. The solids are drawn off and contain at least about 95 weight percent sodium sulfate (anhydrous basis). The mother liquor contains sodium salts comprising at least about 75 weight percent sodium bisulfite (calculated as the pyrosulfite), less than about 12 weight percent sodium sulfite, and less than about 14 weight percent sodium sulfate on the basis of total amount of sodium salt present.

The mother liquor is combined with the spent absorbing solution and enters the desorbing operation to convert sodium bisulfite to sodium sulfite. Sodium hydroxide is employed as the make-up sodium ion to replenish sodium metal lost in the purge system.

The savings in sodium metal value can be appreciated when it is realized that without contact of the purge with sulfur dioxide, in an otherwise similiar system, twice the amount of sodium metal loss may occur.

Various modifications and equivalents will be apparent to one skilled in the art and may be made in the process of the present invention without departing from the spirit or scope thereof.

It is claimed:

1. In a process for removing sulfur dioxide from a sulfur dioxide-containing gas in a sulfur dioxide removal system comprising containing the gas in an absorption zone with an aqueous absorbing solution of sodium sulfite to absorb sulfur dioxide, and the solution contains sodium disulfite and sodium sulfate, and desorbing sulfur dioxide from said resultant aqueous solution in a desorption zone, the improvement comprising withdrawing a sufficient portion of the aqueous solution from the sulfur dioxide removal system to avoid an unduly high concentration of sodium sulfate in the aqueous solution, treating the withdrawn solution having an $s/c$ of about 0.7:1 to 0.95:1 with sulfur dioxide for a period of time sufficient to provide an increase in the $s/c$ of at least about 0.02:1 and the $s/c$ of the withdrawn aqueous solution, after contact with the sulfur dioxide, is about 0.85:1 to 1:1 crystallizing and separating sodium sulfate from said treated withdrawn solution, and passing the resultant mother liquor to the sulfur dioxide removal system.

2. The process of claim 1 wherein the withdrawn aqueous solution is a portion of the aqueous solution passing from the absorption zone to othe desorption zone, and is from about 0.1 to 30 volume percent of the aqueous solution.

3. The process of claim 2 wherein the sulfur dioxide is a sulfur dioxide-containing gas from the desorption zone 4. The process of claim 3 wherein the sulfur dioxide-containing gas contacted with the withdrawn aqueous solution contains at least about 35 weight percent sulfur dioxide and is employed in an amount to provide a sulfur dioxide to sodium sulfite mole ratio from about 0.5 to 15:1.

5. The process of claim 4 wherein product gas from the desorption zone is used as sulfur dioxide-containing gas to treat the withdrawn aqueous solution and the sodium sulfate is crystallized out of the sulfur dioxide-treated withdrawn aqueous solution at a temperature from about 20° to 60°F.

6. The process of claim 5 wherein the sulfur dioxide-containing gas from the desorption zone has a temperature from about 100° to 189°F., and contains from about 40 to 90 volume percent of sulfur dioxide.

7. The process of claim 2 wherein the $s/c$ of the withdrawn aqueous solution, after contact with the sulfur dioxide, is about 0.9:1 to 1:1.

8. The process of claim 1 wherein the crystallization is conducted at a temperature in the range of about 20° to 60°F.

9. In a process for removing sulfur dioxide from a sulfur dioxide-containing gas in a sulfur dioxide removal system comprising contacting sulfur dioxide-containing gas in an absorption zone at tempertures in the range of about 90° to 230°F. with lean, aqueous absorbing solution containing sodium sulfite, sodium bisulfite, and sodium sulfate, to absorb sulfur dioxide; passing the spent aqueous absorbing solution which contains sodium sulfite, sodium bisulfite, and sodium sulfate, having an *s/c* of about 9.7:1 to 0.95:1, to a desorption zone; heating the spent absorbing solution in the desorption zone at temperatures in the range of about 150° to 300°F. to desorb sulfur dioxide and evaporate sulfur dioxide from the solution; and recycling lean absorbing solution to the absorption zone; the improvement comprising withdrawing from the sulfur dioxide removal system a sufficient portion of the spent absorbing solution to prevent sodium sulfate buildup in the sulfur dioxide removal system; treating withdrawn solution with a gas containing at least equal the amount of sulfur dioxide required to combine with the sodium sulfite to form sodium bisulfite on a stoichiometric basis, at temperatures in the range of about 90° to 200°F., to increase the *s/c* of the withdrawn solution at least about 0.02:1 and provide a treated solution having an *s/c* of about 0.85:1 to 1:1; crystallizing and separating sodium sulfate from said treated solution; and passing the resultant mother liquor to the sulfur dioxide removal system.

* * * * *

UNITED STATES PATENT AND TRADEMARK OFFICE
CERTIFICATE OF CORRECTION

PATENT NO. : 3,971,844
DATED : July 27, 1976
INVENTOR(S) : RAYMOND T. SCHNEIDER

It is certified that error appears in the above-identified patent and that said Letters Patent are hereby corrected as shown below:

Column 1, line 51, the word "gases" should follow the word "smelter".

Column 4, line 7, the word "solution" should follow the word "absorbing".

Column 4, line 14, the word "about" should be deleted.

Column 4, line 19, the word "system" should read "systems".

Column 8, line 12, delete "containing" and insert therefor --contacting--.

Column 8, line 15, delete "disulfite" and insert therefor --bisulfite--.

Column 8, line 32, delete "othe" and insert therefor --the--.

Column 8, line 52, delete "189°F." and insert therefor --180°F.--

Column 9, line 1, delete "9.7:1" and insert therefor --0.7:1--.

Signed and Sealed this

Fifth Day of October 1976

[SEAL]

Attest:

RUTH C. MASON
Attesting Officer

C. MARSHALL DANN
Commissioner of Patents and Trademarks

Disclaimer 3,971,844.—*Raymond T. Schneider*, Lakeland, Fla. METHOD FOR REMOVING SODIUM SULFATE FROM AQUEOUS SOLUTIONS. Patent dated July 27, 1976. Disclaimer filed Feb. 3, 1977, by the assignee, *Davy Powergas Inc.*

Hereby enters this disclaimer to all claims of said patent.

[*Official Gazette May 3, 1977.*]